US006745938B2

(12) United States Patent
Sullivan

(10) Patent No.: US 6,745,938 B2
(45) Date of Patent: *Jun. 8, 2004

(54) SYSTEM AND METHODS FOR CARD PAYMENT INSTRUMENT WITH REBATE APPLIED TO AN INSURANCE PREMIUM

(75) Inventor: Kevin Sullivan, Wilmington, DE (US)

(73) Assignee: Bane One, Delaware, Wilmington, DE (US)

( * ) Notice: Subject to any disclaimer, the term of this patent is extended or adjusted under 35 U.S.C. 154(b) by 131 days.

This patent is subject to a terminal disclaimer.

(21) Appl. No.: 10/103,861

(22) Filed: Mar. 25, 2002

(65) Prior Publication Data

US 2002/0096561 A1 Jul. 25, 2002

Related U.S. Application Data

(63) Continuation of application No. 09/364,037, filed on Jul. 30, 1999, now Pat. No. 6,386,444.

(51) Int. Cl.$^7$ .............................................. G06F 17/60
(52) U.S. Cl. ....................................... 235/379; 235/375
(58) Field of Search ................................. 235/375, 379, 235/385, 380; 705/4

(56) References Cited

U.S. PATENT DOCUMENTS

| 3,634,669 | A | 1/1971 | Soumas et al. |
|---|---|---|---|
| 4,594,663 | A | 6/1986 | Nagata et al. |
| 4,642,768 | A | 2/1987 | Roberts |
| 4,750,119 | A | 6/1988 | Cohen et al. |
| 5,117,355 | A | 5/1992 | McCarthy |
| 5,206,803 | A | 4/1993 | Vitagliano et al. |
| 5,233,514 | A | 8/1993 | Ayyoubi et al. |
| 5,297,026 | A | 3/1994 | Hoffman |
| 5,466,919 | A | 11/1995 | Hovakimian |
| 5,513,102 | A | 4/1996 | Auriemma |
| 5,745,706 | A | 4/1998 | Wolfberg et al. |
| 5,787,404 | A | 7/1998 | Fernandez-Holmann |
| 5,806,045 | A | 9/1998 | Biorge et al. |
| 5,970,480 | A | 10/1999 | Kalina |
| 6,070,153 | A | 5/2000 | Simpson |
| 6,105,865 | A | 8/2000 | Hardesty |
| 6,128,599 | A | 10/2000 | Walker et al. |
| 6,164,533 | A | 12/2000 | Barton |
| 6,243,638 | B1 | 6/2001 | Abo et al. |
| 6,243,688 | B1 | 6/2001 | Kalina |
| 6,345,261 | B1 | 2/2002 | Feidelson et al. |
| 6,386,444 | B1 * | 5/2002 | Sullivan ..................... 235/379 |

OTHER PUBLICATIONS

International Search Report for Application No. PCT/US01/05458, Filed Feb. 22, 2001.
CardFlash Mar. 30, 1998.
U.S. Application No. 09/511,362, inventor Kevin M. Sullivan, entitled, "Mutual Fund Card Method and System," filed Feb. 23, 2000 (and currently copending with the above–captioned application).
U.S. Application No. 09/761,763, inventor Kevin M. Sullivan, entitled, "System and Method for Administering A Brokerage Rebate Card Program," filed Jan. 18, 2001 and currently copending with the above–captioned application).
Declaration in Support of an Information Disclosure Statement by Inventor Kevin M. Sullivan dated Nov. 11, 1999.

* cited by examiner

Primary Examiner—Karl D. Frech
(74) Attorney, Agent, or Firm—Hunton & Williams LLP

(57) ABSTRACT

An apparatus and method for a card payment instrument providing that a percentage of consumer spending is rebated to the consumer for payment of premiums or the like for an account with an insurance company. In one version, an applicant provides a benefiting insurance account number to which the rebate is credited based on the rebate amount. The rebate is automatically submitted by the card issuer to the insurance account and, depending on the sizes of the rebate and premium, the cardholder may receive a bill reflecting a reduced premium or even a credit from the insurance concern. In another version, the rebate is submitted as a two-party check which can be cashed by the consumer or submitted by the consumer to the insurance company for cashing.

20 Claims, 4 Drawing Sheets

Credit Statement Bill For Account 12345678 — 300

| Date | Transaction Code | Vender ID | Amount |
|---|---|---|---|
| X | XXX | A | $XX.XX |
| . | . | . | . |
| . | . | . | . |
| . | . | . | . |
| X | XXX | X | $XX.XX |
| Previous Balance | New Changes | Payments | New Balance |
| $XXXX.XX | $XXX.XX | $XXX.XX | $XXXX.XX |

| Card Usage For Month | Usage Rebate for Month | Current Rebate Value | Rebate Payout Date | Beneficiary Account |
|---|---|---|---|---|
| $XXXX.XX | $XX.XX | $YYY.YY | X/X/XX | XXX XXX |

*Figure 3*

Insurance Bill Account XXX XXX — 400

| Policy Number | Premium | Credits* | Amount Due | Due Date |
|---|---|---|---|---|
| XXX XXX | $XXX.XX | $YYY.YY | $YY.YY | X/X/XX |

*Credits
$YYY.YY Transferred from Card Issuer X as usage payout
for Account 1245678 on X/X/XX

*Figure 4*

SYSTEM AND METHODS FOR CARD PAYMENT INSTRUMENT WITH REBATE APPLIED TO AN INSURANCE PREMIUM

RELATED APPLICATIONS

This application is a continuation of application Ser. No. 09/364,037, entitled "System and Methods for Card Payment Instrument with Rebate Applied to an Insurance Premium, " filed on Jul. 30, 1999 now U.S. Pat. No. 6,386,444.

FIELD OF THE INVENTION

The present invention relates generally to a system and method for providing a credit instrument that is associated with insurance providers so that cardholders receive rebates based on card usage which can be applied to insurance premiums.

BACKGROUND OF THE INVENTION

It is increasingly common that consumers pay for many of their products and services using credit cards, charge cards, debit cards, bankcards and like instruments rather than using cash or checks. Consumers do this because they find it more convenient than sending or using cash or checks. Credit cards present unique advantages insofar as they provide a revolving line of credit that can be accessed when personal funds are low. Consumers are inclined to use credit cards versus other means for purchases because itemized reports of transactions (citing amounts and merchant names) are generated each month. This is useful for monitoring one's spending habits, detecting fraud or errors, disputing charges, proving purchase when returning items without a conventional receipt, and providing expense records for end-of-year tax purposes.

In fact, in today's so-called "plastic economy" it is increasingly common that consumers use the credit card as a first, rather than last, resort. Many consumers use credit cards for most non-trivial transactions, taking advantage of the 20–25 day interest-free grace period and paying their balances off each month, sometimes thousands of dollars. At the other end of the spectrum, many consumers who have expenses that exceed their monthly income on a regular basis use the available revolving credit to manage their spending flow. In sum, there is a large body of credit cardholders in modern society who engage in a significant volume of transactions on a regular, continuous basis.

The modern plastic economy greatly benefits merchants and service providers because the convenience and instant credit access lead to greatly increased sales. They also benefit the card issuer (issuing bank) because for each transaction an "interchange" fee (typically 1–4%) administered by the card associations (Visa® and Mastercard®) is distributed to the issuer (deducted from the overall transaction amount). Moreover, the card issuer benefits from the elevated interest payments made by consumers carrying a balance. Therefore, in the card issuer/merchant/customer model of the credit card system, the card issuers and merchants receive substantial benefits.

Consumers tend to use their conventional credit cards for certain types of purchases, such as retail transactions in shopping malls, groceries at foodstores, dinner at restaurants, airline tickets and so forth. The credit card's attributes make it well-suited for use in such transactions and the average consumer is likely to reach for his/her credit card rather than for cash in such circumstances due to convenience.

Consumers do not tend to use credit cards as frequently for "service industry" payments—often recurring charges—such as those for insurance companies, cable television providers and utilities. This is because the "convenience factor" associated with paying a recurring charge (such as an insurance premium) by credit card is somewhat attenuated compared to other transactions where credit cards exhibit a clear advantage over checks or cash. Merchants such as these have been reluctant to offer the card payment option due to concerns about paying interchange fees—not recognizing the benefits in higher tickets and improved collection rates. In general, then, while more and more consumers are using credits cards for their purchases, this tends not to be the case with insurance premiums. As a practical matter, insurance companies, which in all other respects are well-capitalized and critical players in the national economy, are a conspicuously absent beneficiary from the issuer/merchant/customer credit card relationship. Moreover, there is no other mechanism for loyalty- or affinity- building for insurance companies that is based on the consumer's credit or debit card. These are significant disadvantages.

Some card issuers have sought to employ rebates in order to increase use of credit cards. Credit card rebate systems, such as the Discover® card or the like, can provide a rebate tied to general card usage. The entire benefit (a rebate) is enjoyed by the consumer who receives a check or credit. However, such credit card rebate systems provide no particular benefits to insurance companies. There is no loyalty-building to encourage cardholders to maintain insurance accounts or open new ones. Moreover, because the rebate is sent directly to the consumer, who can spend it as he/she pleases, there is no mechanism to channel funds back to insurance companies to expand business and cross-sell. This is a lost opportunity and significant disadvantage.

Other problems and drawbacks also exist with traditional credit card and debit card instruments and rebate programs.

SUMMARY OF THE INVENTION

Accordingly, it is one object of the present invention to overcome one or more of the aforementioned and other limitations of existing systems and methods for the use of credit card and debit card instruments.

What is desired is a system and method of providing a credit or debit card system that provides rebates based on card usage that can be applied to bills for an insurance policy so that cardholders share in the financial benefits of card usage.

It is another object of the invention to provide such a credit instrument whereby such a rebate program encourages cardholders to remain loyal to the insurance company by maintaining accounts and opening new accounts.

It is another object of the invention to provide a credit instrument whereby a predetermined percentage of consumer credit card spending is rebated so as to encourage customer loyalty to the card issuer.

It is another object of the invention to provide a credit instrument whereby a predetermined percentage of consumer credit card spending is applied to payments due on an insurance account of the cardholder so as to encourage card use and thereby increase card issuer income.

It is another object of the invention to provide a credit instrument whereby a predetermined percentage of consumer credit card spending is applied to an insurance provider so as to encourage customers to maintain their account with the card issuer because the card usage rebates are paid on a periodic basis.

It is another object of the invention to provide such a credit instrument where the card issuer and the insurance concerns share the costs of the rebate program so that a significant rebate can be provided without imposing excessive costs on the card issuer.

To achieve these and other objects of the present invention, and in accordance with the purpose of the invention, as embodied and broadly described, an embodiment of the present invention comprises an apparatus and method for a credit instrument providing that a percentage of consumer spending is rebated to the consumer "earmarked" for payment of insurance premiums or the like for an account with an insurance company. In one version, an applicant provides the card issuers a benefiting account number to which the rebate is credited at the insurance provider based on the rebate amount. The rebate is automatically applied to the insurance account and, depending on the size of the rebate and premium that is due, the cardholder may receive a bill (paper or electronic) reflecting a reduced premium or even a credit from the insurance concern. In another version, the rebate is submitted as a two-party check which can be cashed by the consumer or submitted by the consumer to the insurance company along with a personal "co-payment" for any remaining balance due. The card itself may carry the name of the insurance company on the card face or backing.

This system (which may be referred to as the Insurance Accelerator™) is advantageous in a number of respects. It is beneficial to card issuers because it encourages card use, creation of new accounts, and maintenance of existing accounts. At the most basic level, the system provides insurance companies an entree into the credit card economy. It is beneficial to associated insurance concerns who are exposed to new markets of potential customers and expanded opportunities to create a loyalty and retention platform for existing customers. With a reduction in premiums, cardholders may decide to increase levels of insurance coverage or purchase new products outright. The concept opens the door for unique partnering relationships, not otherwise readily established, between banks and insurance concerns. And finally, the system is advantageous to cardholders who receive the benefit of their credit card spending through rebates that can be issued as checks or automatically transferred to their insurance accounts.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 3 is a block diagram according to an embodiment of the invention illustrating an exemplary credit card bill issued to a cardholder, including summaries of the rebate balance.

FIG. 4 is a block diagram according to an embodiment of the invention illustrating an exemplary insurance account bill, including a summary of credits rebated by the card issuer system.

DETAILED DESCRIPTION OF THE INVENTION

As discussed in the Summary of the Invention, the present invention is directed to a method and apparatus for a credit instrument that is associated with a cardholder's insurance account, whereby rebates based on card usage are applied to the insurance account payments due.

Overview of the Invention According to One Embodiment

Figure 1:
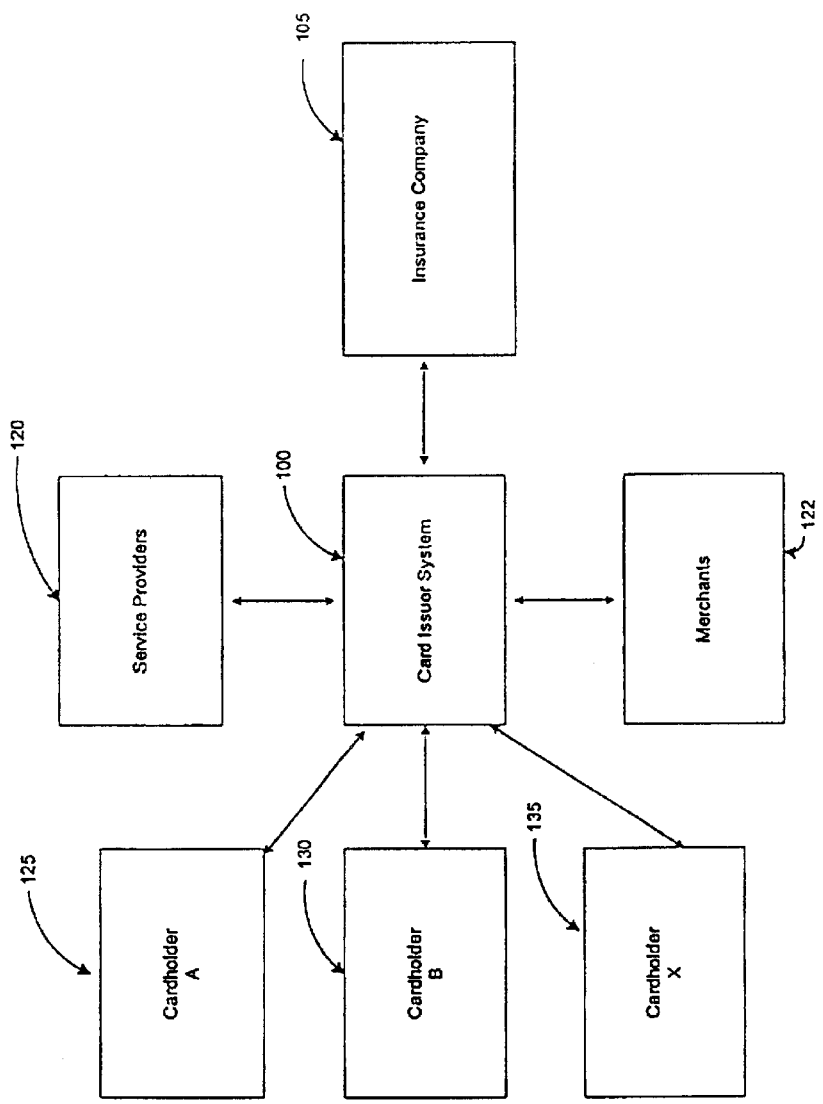
FIG. 1 is a block diagram illustrating the relationship between cardholders, service providers, merchants, the card issuer system and insurance companies, according to an embodiment of the present invention.

FIG. 1 provides an overview of the relationships between the various components according to one embodiment of the present invention, and may comprise cardholder A 125, cardholder B 130, cardholder X 135; card issuer system 100; service providers 120 and merchants 122; and insurance company 105. Card issuer system 100 may comprise a server-based system carrying out the operations of the card issuer, such as for receiving applications, maintaining account data, processing transactions, and interfacing with cardholders, merchants, service providers and insurance companies.

Service providers 120 and merchants 122 illustrate the various vendors that interact with cardholders A–X (blocks 125–135) and card issuer 100 during transactions involving the purchase of goods and services.

Insurance company 105 represents an insurance company participating in the Insurance Accelerator™ program associated with the present invention. Insurance company 105 may comprise personnel and/or computer means for receiving and processing usage rebate funds or "points" submitted by card issuer system 100 or from individual cardholders, such as cardholders A–X (blocks 125–135). In one embodiment, the invention provides for insurance company 105 to receive and process checks or wire transfers from card issuer system 100 so that the card usage rebate for a given time period is sent from the card issuer to the insurance provider to be credited against the benefiting insurance account. In a related embodiment, the invention provides for insurance company 105 to process electronic transfers (such as automated clearing house drafts) from card issuer system 100 that are processed in an automated or semi-automated fashion to credit the proper insurance company financial institution account with the proper card usage rebates. In essence, these transfers are finding all or some of the dollars for the cardholder's insurance premium. In another embodiment, the invention provides for insurance company 105 to receive and process two-party checks, initially issued to cardholders from card issuer system 100, that are forwarded by the cardholders for payment to, processing and cashing by the insurance companies. Generally, these two-party checks would be made out to both a specific cardholder and specific insurance company so that they could be cashed by either party.

In the preferred embodiment, insurance company 105 represents an insurance company that is partnered with the card issuer issuing a so-called "co-branded" credit or payment instrument. For such co-branded credit or debit cards, the physical card may be issued in the insurance company's name (and also in the card issuer's name) to take advantage of the benefits of cross-selling and to facilitate loyalty-building. In another embodiment, the rebate program is not marketed as a co-branded offering per se, but cardholders may provide the account numbers for their particular insurance companies so that the proper account can be credited using the card usage rebates (via check, wire transfer, electronic transfer from card issuer system 100, or via two-party check sent from the cardholder, both scenarios described above). In such an embodiment, the cards might not be issued in a co-branded manner with the name of the insurance company.

Cardholder A 125, cardholder B 130 and cardholder X 135 represent cardholders maintaining card accounts according to the present invention. In other words, these cardholders maintain a credit or debit card account with the card issuer whereby a predetermined percentage of card usage is accumulated and returned as a rebate to be applied to premiums for an account with an insurance provider.

As mentioned above, in the preferred embodiment, these cardholders A–X (blocks 125–135) maintain insurance accounts with insurance companies that are already associated with the card issuer (so-called "co-branded").

In an alternate embodiment, cardholders can maintain insurance accounts with insurance companies that are not formally partnered with the card issuer, as described previously. In this case, the card issuer has not entered into a formal arrangement with the insurance company, but rather is marketing the card to consumers on the basis that rebates will be made against an insurance premium on an insurance account designated by the cardholder. This rebate may take the form of a two-party check sent to the cardholder for submission to the insurance company as a co-payment. Or the rebate could be sent directly to the insurance company (by check, wire transfer, electronic payment, and the like). One of the benefits of this alternate embodiment is that it encourages non-partnered insurance companies to consider a formal partnering relationship (e.g., a co-branded card). This is because an initially non-partnered insurance company gradually becomes aware of the profit and marketing potential that exist from co-branding and participating in the program. This benefits both the card issuer and insurance company because processing can be streamlined (e.g., rebates can be transferred electronically and automatically, even in batch fashion, rather than through wire transfers or checks) and cross-marketing and joint loyalty benefits accrue. For example, the card issuer and insurance company can cross-market whereby customers of the one are solicited to purchase the products or engage the services of the other. A co-branded debit card could serve as a consumer access vehicle to an insurance company deposit account such as a money market fund. This is a substantial advantage.

Cardholders A–X (blocks 125–135) interface with card issuer system 100 for purposes of payment and receipt of bills and the like using the mail system, Internet or like shared network. Cardholders A–X (blocks 125–135) interface with merchants 122 and service providers 120 to consummate purchases and the like in-person or using the mail system or Internet or like shared network. Cardholders A–X (blocks 125–135) interface with insurance company 105 for purposes of opening accounts, submission of payments, receipt of bills and the like using the mail system, Internet or like shared network.

As noted above, the present invention may provide a percentage rebate based on card usage that can be paid by the card issuer. In one embodiment, that amount may be fixed at 1% of purchase transactions vesting after a standard period, such as a quarter or year. In this embodiment, the balance of the usage rebate will be updated and reported to the cardholder on a periodic basis, such as at the time each monthly card statement is issued. The usage rebate rate can vary, for example, based on the insurance concern (higher or lower rebate rates depending on the insurance company and the agreement with the card issuer) and based on the cardmember (higher or lower rebate rates based on the cardmember's past or ongoing purchasing behavior, credit rating, levels of spending [e.g., a higher rebate rate at higher levels of spending], loyalty in terms of how long the cardmember has been associated with the card issuer and/or the insurance company, payment performance, etc.). In one embodiment, the funding for the usage rebate may be shared between the card issuer and an insurance company as both benefit from the arrangement.

Regarding the accrual or computation period, the usage rebate may be computed on a periodic basis, such as on a monthly basis. Since credit card issuers generally deliver paper or on-line statements to cardholders on a monthly basis, it may be convenient and cost-effective to accrue and report the usage rebate in similar fashion. Timing for payout, i.e., when the rebate funds are transferred to the cardholder or insurance company, can vary as well. In one embodiment, the payout period may be annually or semi-annually so as to more or less coincide with the timing of the cardholder's insurance premium due dates. This reduces processing costs for the cardholder and insurance company. It can also enhance cardmember loyalty to both the card issuer and insurance company if the payout is predicated on the cardmember still being an active account holder. For example, a cardmember contemplating canceling the credit account and/or the insurance program in July may be less inclined to do so if he/she knows that the accumulated rebate that will mature or vest later in September would be lost.

A variety of different types of insurance accounts would be susceptible to the present invention. The premiums or payments for nearly any product offered by an insurance company could be reduced by the usage rebates, such as the following non-exhaustive list of offerings: whole life insurance, term life insurance, variable annuities, fixed annuities, children's insurance, AD&D (accident, death and disability) insurance, disability insurance, automobile/boat insurance, fire insurance, flood insurance, home insurance, credit protection, and mortgage insurance. As can be readily appreciated, this means that the present invention provides significant opportunities for insurance companies to market cardmembers on the spectrum of products that are available.

As noted in the Summary of the Invention, there are numerous advantages that follow from the invention. By paying a usage rebate, the cardmember is encouraged to use his/her credit card as the purchase means of first choice, thus increasing revenue for the card issuer. Loyalty to both the card issuer and associated insurance concern is enhanced. Insurance companies are incentivized to participate in the program, even becoming co-brand partners, since non-participating companies may lose accounts to participating insurance companies. This further increases revenue for the card issuer. It also presents opportunities for new accounts to be opened by cardmembers. Both the card issuer and the insurance company benefit from the cross-marketing and dual image-building that result from partnering in the program. Cardmembers benefit because they share in the profits generated by their credit card usage and see the results manifested in reduced insurance premiums.

The Card Issuer System

Figure 2:
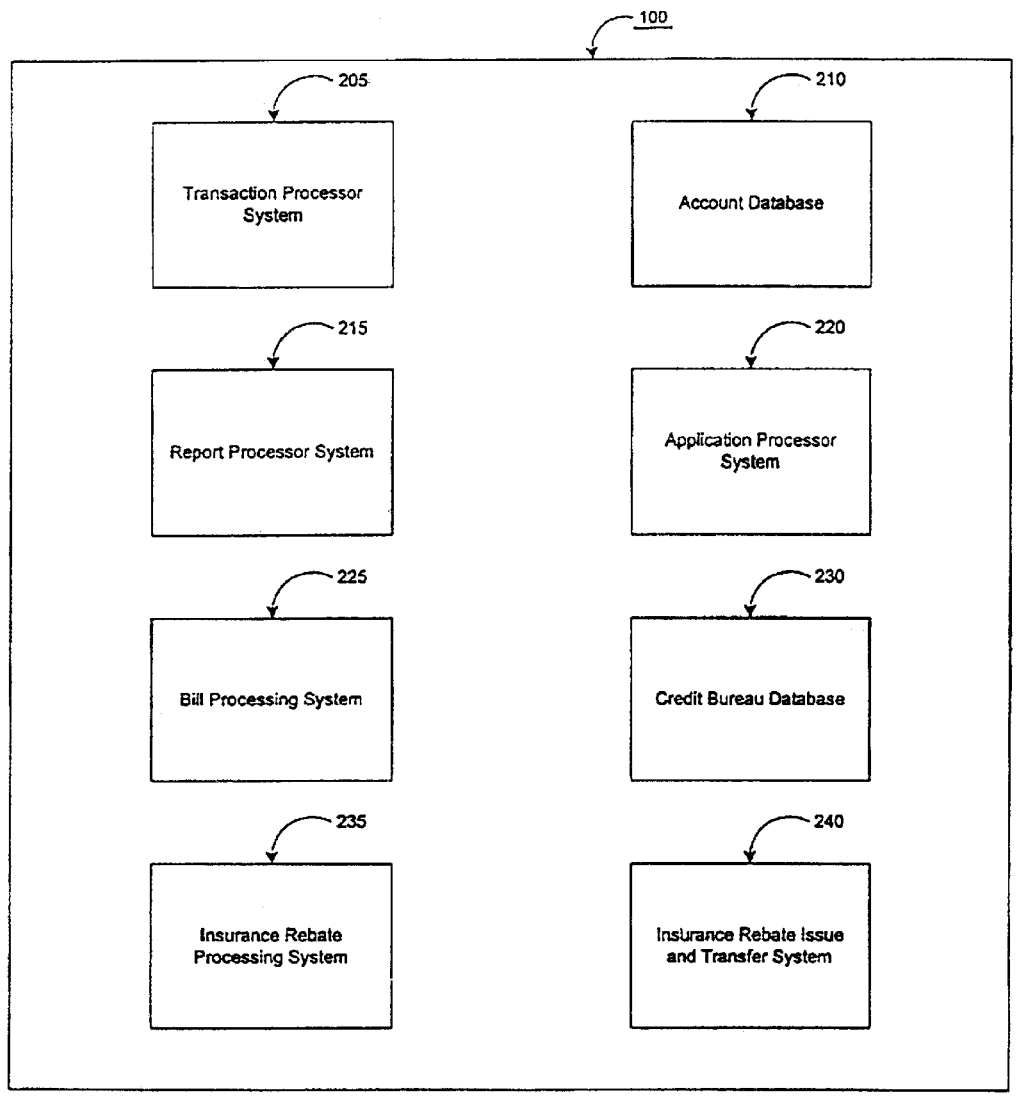
FIG. 2 is a block diagram according to an embodiment of the invention illustrating the components of the card issuer system.

FIG. 2 illustrates card issuer system 100, which may comprise transaction processor system 205; account database 210; report processor system 215; application processor system 220; bill processing system 225; credit bureau database 230; insurance rebate processing system 235; and insurance rebate issue and transfer system 240. Those of skill in the art should appreciate that the allocation of the aforementioned elements is exemplary and functional, the purpose here being to explain the present invention most clearly. The functions performed by said elements could be allocated differently, such that the elements could be combined or further divided depending on the requirements of specific implementation into hardware and/or software. Additionally, the elements of the system need not be co-located, but could reside at geographically distinct locations and could interface using communications technologies well known in the art, such as direct-dial connections, hard-wire link, the Internet or IPng (Internet Protocol next generation), satellite, microwave, cellular networks and so on.

Transaction processor system 205 is a computerized system, which may be a server-based system, for processing transactions in the credit card-based system, such as consummating purchases (issuing transaction codes, declines, call the bank ["call me"] referrals, etc.), processing payments from cardholders, and processing transactions with insurance companies. Account database 210 may comprise one or more data modules having account data for the cardholders, including insurance account data and insurance company data. Report processor system 215 generates reports for the card issuer and/or insurance company summarizing cardholder activity, profits and revenue and the like. Application processor system 220 receives and processes applications for credit cards, and may set—up accounts when applications are approved. In one embodiment, application processor 220 could also receive applications for insurance accounts and process said requests or forward them to the appropriate insurance company for processing. Bill processing system 225 prepares the bills to be sent to cardholders, including a summary of charges, balance due, accrued rebate balance, due date and the like. Credit bureau database 230 may comprise a database accessed for application processing for making the underwriting determination associated with credit card approval and/or insurance account approval. Since the present invention is susceptible to application to debit cards, the aforementioned elements could perform the corresponding operations for a debit card instrument.

Insurance rebate processing system 235 performs the processing associated with accounts established for cardholders under the present invention and, accordingly, computes card usage over the proper period, computes the usage rebate, and maintains the usage rebate balance for participating cardholders. Insurance rebate issue and transfer system 240 performs the processing and transactions for issuing and transferring the usage rebates in the appropriate amounts and at the proper times. Thus, insurance rebate issue and transfer system 240 may determine that a six-month rebate for a certain insurance account will vest for a particular cardholder on December 15 and transfer said rebate via check, wire transfer, or electronic transfer to the insurance company. Data stored in account database 210 may be accessed to inform insurance rebate issue and transfer system 240 whether the form of the transfer should be check, wire or electronic for a particular insurance account or insurance company. Insurance rebate issue and transfer system 240 may determine that the usage rebate should be issued to the cardholder in the form of a two-party check.

Exemplary Credit Card and Insurance Statements for the Invention

FIG. 3 illustrates an exemplary statement (bill) issued to a cardholder according to the invention. As those of skill in the art will appreciate, the bill could be issued through the mail or via facsimile or Internet or like networked interface. As depicted by FIG. 3, the credit card statement resembles a typical credit card statement, identifying the date, transaction codes, vendor/merchant ID's and amounts for the transactions from the last period. The previous balance, new charges, payments and new balance are also reported. For purposes of reporting the status of the usage rebate, the card usage for the period (here for the month it is "$XXXX.XX") is reported, as well as the usage rebate for the period as computed based on the rebate rate (e.g., 1% of $XXXX.XX yields a usage rebate for the month in the amount of $XX.XX). The current rebate value or balance is reported (here it is "$YYY.YY"), reflecting the accrued value of the usage rebate that has yet to vest or be paid out. The rebate payout date reflecting when the usage rebate will vest or be made available is reported (here it is "X/X/XX"), as is the identity of the beneficiary account (insurance account) to which the rebate may be applied.

FIG. 4 illustrates an exemplary insurance bill that might be generated by the insurance company according to the present invention. As would typically be the case, the policy number, premium or payment, and due date are listed. Credits received from a card issuer in the form of usage rebates (here it is "$YYY.YY") according to the present invention may be listed as credits, with an explanation identifying the amount and source of the credits (usage rebates). The credits may be applied to the premium or payment to render a reduced amount due. Here the reduced amount due is "$YY.YY."

It should be noted that the insurance bill illustrated by FIG. 4 is more illustrative of the card usage rebate application where rebate funds are sent or transferred from the card issuer to the insurance company. In the embodiment providing for rebate finds to be sent to the cardholder in the form of a two-party check or the like, the cardholder will forward the total premium to the insurance company and the need for the adjusted bill depicted by FIG. 4 may be obviated.

A Method for Providing Card Usage Rebates for Insurance Premiums

Figure 5:
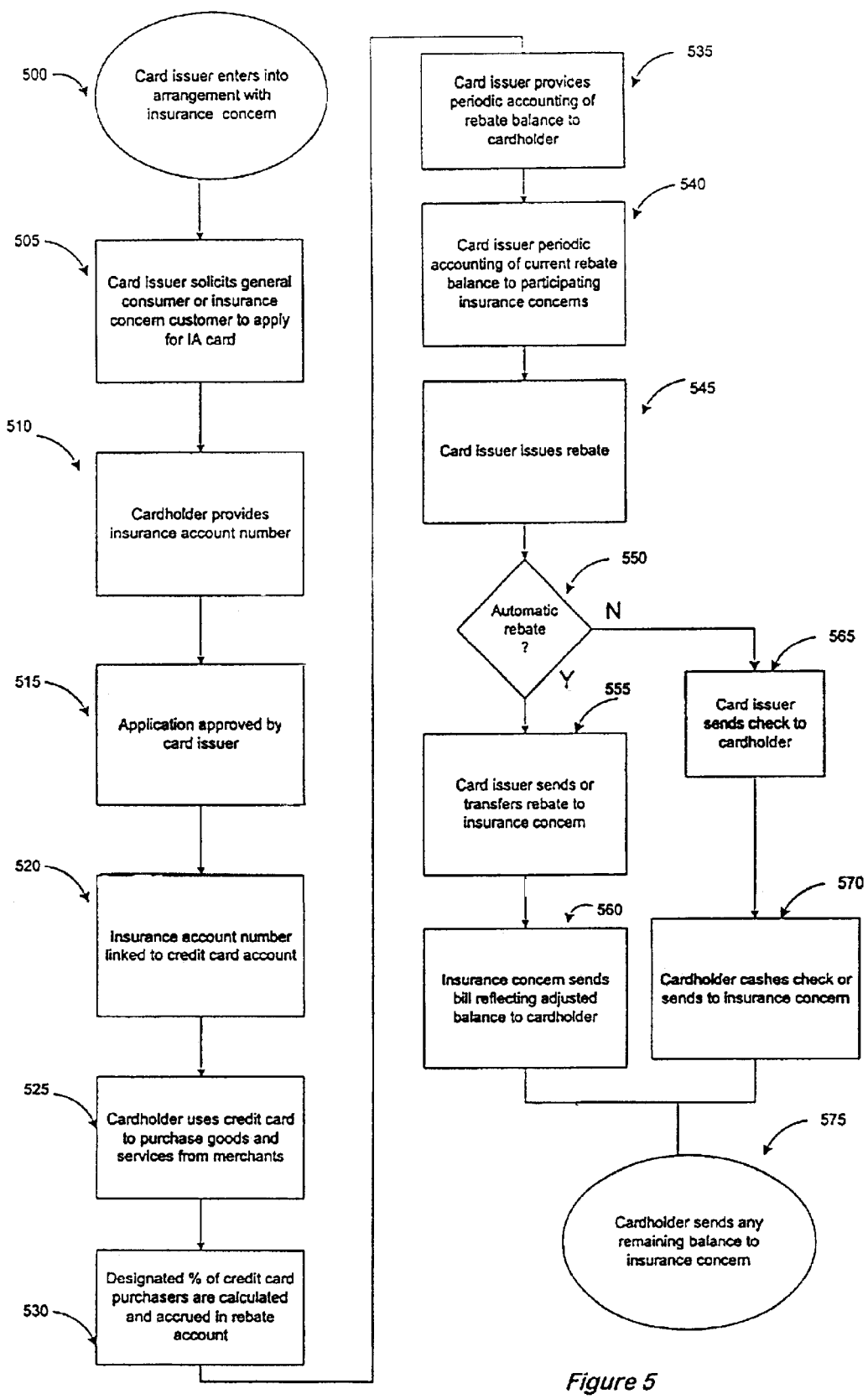
FIG. 5 is a flowchart illustrating a method according to an embodiment of the invention for providing rebates to a cardholder's insurance account based on card usage.

According to an embodiment of the present invention, FIG. 5 depicts a method for a credit card system providing card usage rebates to cardholders for application to insurance account premiums. Where the instrument is a debit card, the steps are substantially the same except the usage is based on a debit instrument.

A card issuer enters into an arrangement with an insurance concern (e.g., see account database 210), according to step 500. As previously noted, this arrangement may be in the form of a partnering or co-branding undertaking whereby the credit or debit cards are issued under an insurance company's name and the two parties have pre-established procedures for handling the processing associated with the accrual and application of rebates to an insurance account. Alternatively, the insurance concern and card issuer may not have a partnering relationship, or have any pre-existing relationship at all, but step 500 includes the interface and communication between the two entities for the usage rebate program to be implemented for a given cardholder.

According to step 505, the card issuer (or its agent) solicits a general consumer or insurance concern customer (existing account holder with an insurance company) to apply for the instant IA (Insurance Accelerator™) card. The cardholder provides to the card issuer (e.g., see card issuer system 100, application processor system 220) information of the insurance account number that will be the beneficiary account, as in step 510. The application is processed and approved by the card issuer (e.g., see application processor system 220, credit bureau database 230), according to step 515. The insurance account number is linked or associated with the credit card (or debit) account (e.g., see account database 210), according to step 520. The cardholder uses the credit (or debit) card to purchase goods and services from merchants (or service providers) (e.g., see transaction processor system 205), according to step 525. A designated percentage of credit card purchases are calculated and accrue in the usage rebate account (e.g., see insurance rebate processing system 235 and account database 210), according to step 530.

The card issuer provides a periodic accounting of the usage rebate balance to the cardholder (e.g., see bill processing system 225), according to step 535. The card issuer provides a periodic accounting of the current rebate balance to participating insurance concerns, according to step 540. The card issuer issues a rebate (see, e.g., module 240, FIG. 2) when the usage rebate "vests" or is due to be paid out, according to step 545. If the rebate is to be a so-called "automatic" payout (sent from the card issuer to the insurance concern), according to the "Y" (yes) branch of block 550, then the card issuer sends or transfers the rebate to the insurance concern to be credited to the proper insurance account (e.g., see module 240, FIG. 2), according to step 555. The insurance concern sends a bill reflecting the adjusted balance, according to step 560. If the rebate is not a so-called "automatic" rebate, according to the "N" (no) branch of block 550, the card issuer sends a check (two-party check or bank draft, or wire or electronic transfer, or the equivalent) to the cardholder (e.g., see module 240, FIG. 2), according to step 565.

According to step 570, the cardholder cashes the check or like instrument or sends it to the insurance concern. According to step 575, the cardholder sends any remaining balance due to the insurance concern.

Other embodiments and uses of this invention will be apparent to those having ordinary skill in the art upon consideration of the specification and practice of the is invention disclosed herein. The specification and examples given should be considered exemplary only, and it is contemplated that the appended claims will cover any other such embodiments or modifications as fall within the true scope of the invention.

What is claimed is:

1. A method of rewarding usage of a credit or debit instrument, comprising:
   monitoring cardholder usage of a credit or debit card issued by a first party comprising a card issuer;
   computing a measure based on the monitored usage that is redeemable with a second party comprising an insurance entity;
   redeeming the measure to provide the cardholder with value applicable to an existing insurance account associated with the cardholder;
   thereby rewarding conduct with respect to the first party comprising a card issuer by providing value that encourages conduct with respect to the second party comprising the insurance entity.

2. The method of claim 1, wherein the value applicable to an existing insurance account reduces an amount that the cardholder would otherwise have to pay under the insurance account.

3. The method of claim 2, wherein the amount comprises a premium payment.

4. The method of claim 1, wherein the measure comprises rebate funds.

5. The method of claim 1, wherein the measure comprises rebate points.

6. The method of claim 1, wherein the value is applied by crediting the existing insurance account.

7. The method of claim 6, wherein the application processor forwards the applications for insurance accounts to the second party.

8. The method of claim 1, wherein the card is issued as a co-branded card identifying both the first party comprising the card issuer and the second party comprising the insurance entity.

9. The method of claim 1, wherein the first party comprising the card issuer operates an application processor for receiving applications for credit cards and for receiving applications for insurance accounts, thereby facilitating cross-selling between the first party and the second party.

10. The method of claim 9, wherein the application processor processes the applications for insurance accounts.

11. A card based payment system for rewarding conduct with respect to a first party by providing value with respect to a second party, comprising:
    a credit or debit card issued by a card issuer to a cardholder;
    a card issuer system for processing transactions and computing a measure based on card usage that is redeemable with an insurance concern;
    an insurance concern system for redeeming the measure to provide value applicable to an existing insurance account associated with the cardholder;
    thereby rewarding conduct with respect to the first party comprising a card issuer by providing value that encourages conduct with respect to the second party comprising the insurance concern.

12. The card based payment system of claim 11, wherein the value applicable to an existing insurance account reduces an amount that the cardholder would otherwise have to pay under the insurance account.

13. The card based payment system of claim 12, wherein the amount comprises a premium payment.

14. The card based payment system of claim 11, wherein the measure comprises rebate funds.

15. The card based payment system of claim 11, wherein the measure comprises rebate points.

16. The card based payment system of claim 11, wherein the value is applied by crediting the existing insurance account.

17. The card based payment system of claim 11, wherein the card is issued as a co-branded card identifying both the first party comprising the card issuer and the second party comprising the insurance concern.

18. The method of claim 11, wherein the first party comprising the card issuer operates an application processor for receiving applications for credit cards and for receiving applications for insurance accounts, thereby facilitating cross-selling between the first party and the second party.

19. The method of claim 18, wherein the application processor processes the applications for insurance accounts.

20. The method of claim 18, wherein the application processor forwards the applications for insurance accounts to the second party.

* * * * *

UNITED STATES PATENT AND TRADEMARK OFFICE
CERTIFICATE OF CORRECTION

PATENT NO.   : 6,745,938 B2
DATED        : June 8, 2004
INVENTOR(S)  : Kevin Sullivan It is certified that error appears in the above-identified patent and that said Letters Patent is hereby corrected as shown below:

<u>Title page,</u>
Insert Item -- [73] Assignee: Bank One, Delaware --

Signed and Sealed this

Ninth Day of November, 2004

JON W. DUDAS
*Director of the United States Patent and Trademark Office*